Patented July 16, 1929.

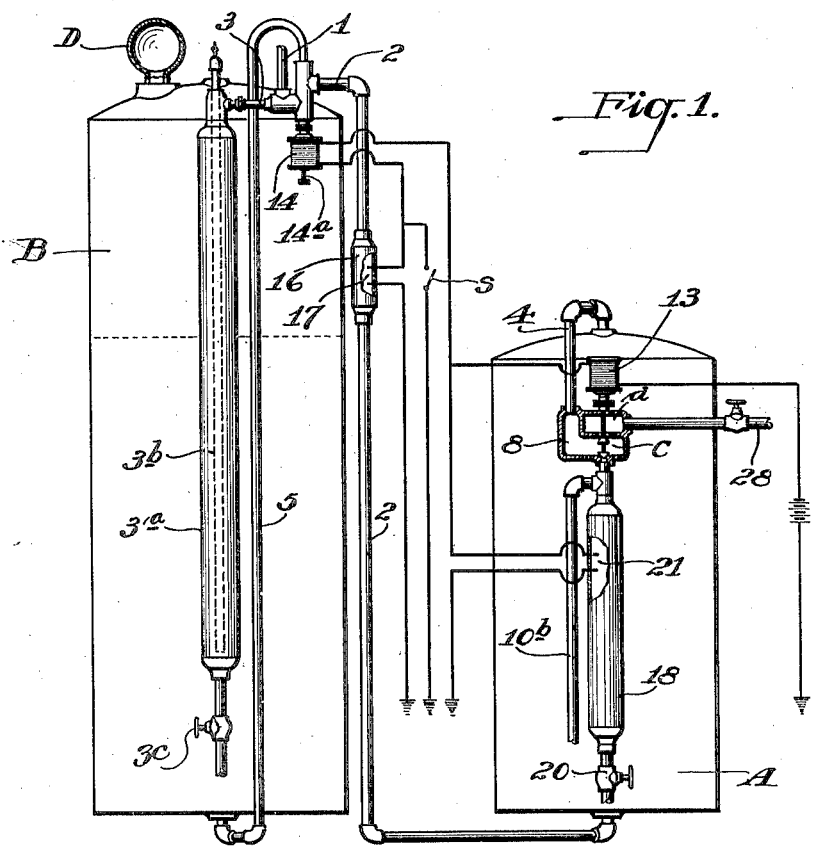

1,721,105

UNITED STATES PATENT OFFICE.

ANDREW J. DOTTERWEICH, OF PITTSBURGH, PENNSYLVANIA.

TREATMENT OF WATER.

Application filed November 17, 1926. Serial No. 148,863.

Annoyance and expense are experienced in the operation of water softeners of the automatic regenerative type by the corrosive action of the brine on the valve controlling the flow thereof to the water treating tank, the softeners under the present practice being so constructed that the brine is in constant contact with the valve.

The invention described herein has for its object the provision of means whereby the brine in the parts adjacent to the brine controlling valve is replaced by fresh water.

The invention is hereinafter more fully described and claimed.

Figure 4:
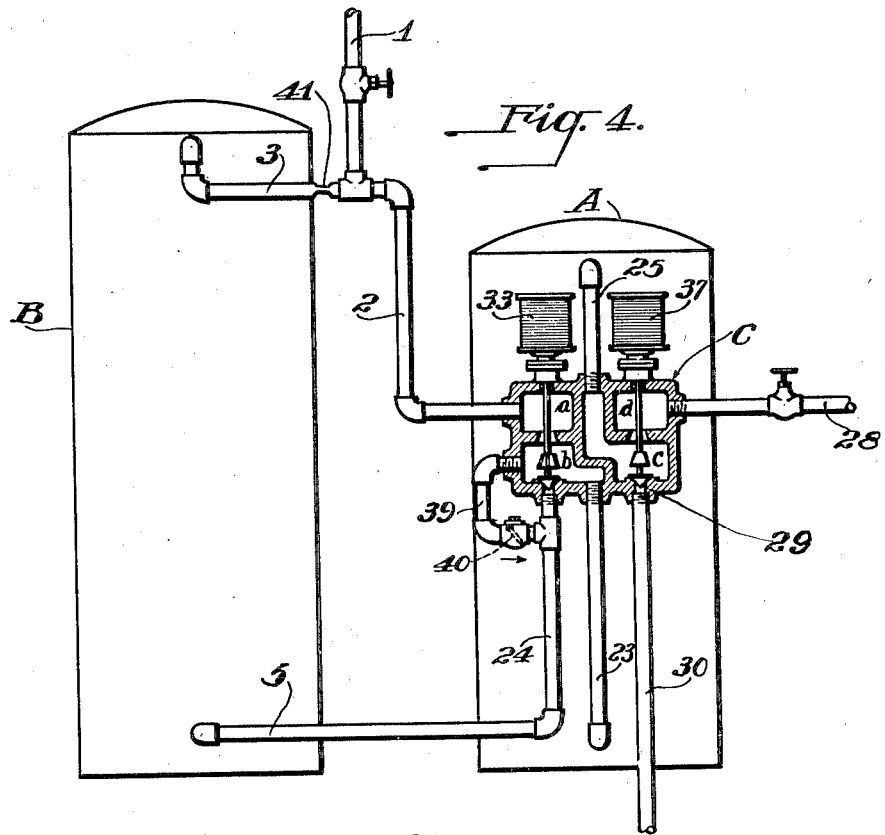
Figure 5:
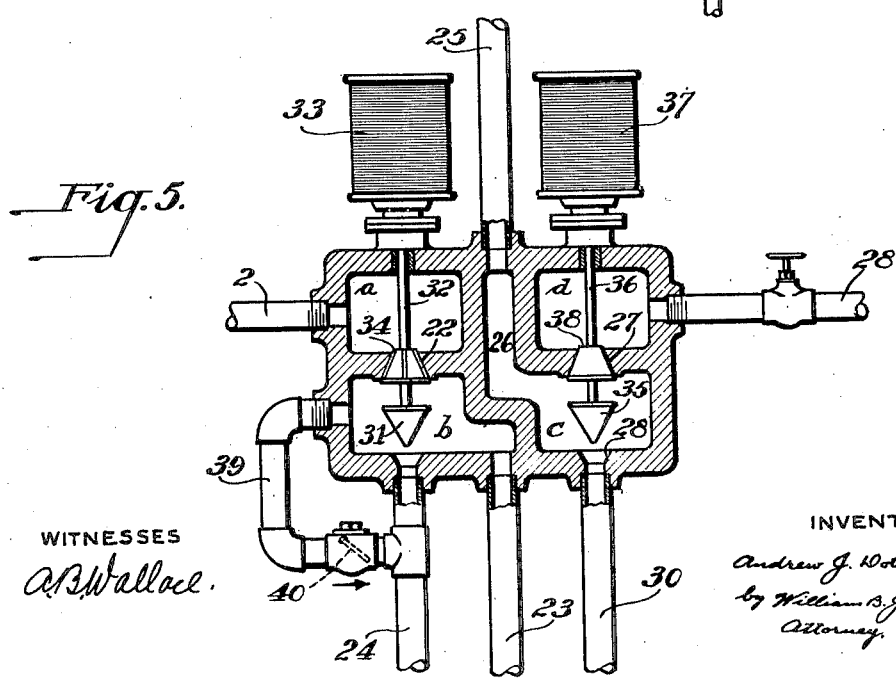

In the accompanying drawings forming a part of this specification, Fig. 1 shows partly in elevation and partly in section a regenerating apparatus embodying the improvements claimed herein; Fig. 2 is a sectional view illustrating the valve mechanism controlling the flow of brine to the treating tank; Fig. 3 is a sectional view on an enlarged scale showing the valve mechanism controlling the flow of water from the treating tank to the service pipe and to the drain; Fig. 4 shows partly in section and partly in elevation a modification of the apparatus shown in Fig. 1; and Fig. 5 is an enlarged sectional view of the valve box shown in Fig. 4, the valves being in position for regeneration.

In the construction shown in Fig. 1 the raw water supply pipe 1 has branches 2 and 3 for conducting water to the treating tank A and the brine tank B. The branch 2 is connected to the lower end of the tank A which has a valved outlet 4 for the softened water at or adjacent to its upper end. The branch 3 is connected to the upper end of the brine tank such connection preferably including a salt trap which will be hereinafter described and a connection 5 extends from the lower end of the brine tank to the branch 2 leading to the treating tank. This salt trap consists of a tubular member $3^a$ connected at its upper end to the branch 3, and a pipe $3^b$ extending down toward the lower end of the tubular member and having its upper end connected to the upper end of the brine tank B. The tubular member $3^a$ is provided at its lower end with a suitable drain cock $3^c$.

The flow of brine from the tank B, except when the material is being regenerated, is prevented by a check valve 6 which will however permit a flow of raw water into the pipe 5 to displace the brine in the portion of the pipe 5 as hereinafter described. Although both tanks are connected to the supply pipe, fresh water can flow only to the tank A until the check valve is opened. Provision is made for opening the check valve when regeneration is required so that when an outlet from the tank A leading to a drain is opened, brine can flow into the branch, but as the pressures of the fresh water and the brine are equal at the junction of the pipe 5 to the branch, the flow of fresh water towards the tank is reduced to permit the flow of brine to tank A. This reduction of flow of fresh water can be effected by any suitable means such for example as by a gate 7 movable across the branch 2. In practice it is preferred to dilute the saturated solution of brine flowing from the tank B, and to that end the gate 7 is so connected as to permit of the mingling of fresh water with the brine as it enters the branch 2.

The tank A has a valve controlled outlet at a point above the body of the treating material, said outlet being connected to the drain. When it is desired to regenerate the material, the outlet to the drain is opened and the gate 7 moved to position to reduce the flow of fresh water in the branch and at the same time the check valve 6 is opened to permit the flow of brine into the branch.

While any suitable means may be employed to operate the flow reducing gate, open the brine check valve, and open the valve controlling the drain outlet from tank A, it is preferred to employ electrically operated means for these purposes, such for example as that shown. A passage 8 in the valve box 9 is connected to the tank A at a point above the body of the treating material in the tank, said passage communicating with a chamber $c$ in the box, said chamber having an outlet port 10 which is preferably connected by a pipe $10^b$ to a drain. The chamber $c$ also communicates through a port $10^a$ with a chamber $d$ from which softened water is conducted to the point or points of use by a pipe 28. The flow of water through these ports 10 and $10^a$ is controlled by valves 11 and $11^a$ which are so arranged on a stem 12 connected to the core of a solenoid 13 that one port will be closed when the other is opened. The gate 7 is connected to the core of a solenoid 14 and said gate is provided with a prong 15 adapted when the gate is raised to reduce flow of fresh water to the tank A, and to unseat the check valve 6 thereby permitting brine to mingle with the fresh water.

In the practice of the invention it is preferred to provide a saturated solution of brine and to vary the strength of the solution flowing to the treating material by the addition of fresh water to the brine as hereinbefore stated, and in order to regulate the quantity of fresh water added to the brine, provision is made for controlling the movement of the gate 7. In the construction shown herein the core of the solenoid 14 is provided with a threaded stem $14^a$ for the reception of a nut which will operate to limit the movement of the gate 7.

The circuit employed for energizing the solenoids to initiate regeneration is shown diagrammatically in Fig. 1. The switch S which is normally open is closed to energize the solenoids 13 and 14. The consequent movement of the core of the solenoid 13 opens the port 10 to the drain and closes the port $10^a$. The movement of the core of the solenoid 14 shifts the gate 7 to reduce the flow of fresh water to the tank A and at the same time unseats the valve 6 permitting brine to enter the stream of fresh water flowing through to the tank A. At a point in the branch pipe 2 is formed a chamber 16 into which spaced terminals 17 project, one of said terminals being connected to the circuit and the other to ground. The switch is held closed until the water in the chamber 16 is rendered conductive by the brine solution, whereupon the switch is opened.

The brine will now flow up through the material in the tank A effecting regeneration, out through the passage 8 and chamber $c$ in the valve box 9 and drain pipe $10^b$.

The drain pipe is connected to the upper end of a chamber 18, the flow from the chamber being controlled by valve 20. Spaced terminals 21 project into the chamber 18, one of the terminals being connected to ground and the other terminal connected to the circuit of the solenoids 13 and 14, at such a point that when the terminals are connected electrically by brine in the chamber 18 the solenoid 14 controlling the admission of brine to the tank A will be cut out of the circuit. It will be understood that when the switch S is closed to open the brine valve 6 and shift the gate 7 to reduce the flow of fresh water to the tank A, the closure of the switch also shifts the valve 10 to permit flow from the tank to the drain. As soon as brine enters the chamber 16 electrically connecting the terminals 17, the switch S is opened, the circuit of the solenoids being completed through the terminals. The brine valve will remain open until brine fills the chamber 18 electrically connecting the terminals 21 thereby short circuiting the solenoid 14, whereupon the valve 6 by its own weight will close, and the gate 7 drop, permitting a full flow of fresh water through the tank A to eliminate the brine from the treating material. The circuit through the drain solenoid will remain closed as long as the water flowing through the chamber 18 is sufficiently saline to electrically connect the terminals 21. The duration of the flushing period is regulated by adjusting the valve 20 so that the flow of water through chamber 18 is small in proportion to the flow out of drain pipe $10^b$. In this manner a saline solution will be retained in chamber 18 to maintain the circuit across terminals 21 for a sufficient period to thoroughly flush the softening material in tank A, and valve 11 will be retained in its open position as long as solenoid 13 remains energized. Valve 20 is held open at all stages of operation and is adjustable for the purpose of regulating the flow through chamber 18 to control the flushing period as stated above.

It has been found in practice that the capacities of the tanks vary with changes of pressure of the water therein. As for example, if the normal pressure in the supply lines is about eighty pounds, the pressure in the tanks when the outlet valves are closed, will be the same but the opening of the outlet to the drain will permit a full free escape of water and the pressure in the tanks will drop fifteen to twenty pounds, more or less, and on account of the resilience of the walls of the tanks the drop of pressure will result in a decrease of the tanks. It has been found that in the case of a brine tank having a diameter of sixteen (16) inches and a length of forty-eight (48) inches, and normally subjected to eighty pounds pressure, the opening of the outlet to the drain will result in such a reduction of the capacity of the brine tank as to require, after the closure of the drain valve, the injection of about a pint of water to restore the pressure in the tank to city service pressure. Advantage is taken of this change of capacity with change of pressure in the brine tank to displace the brine in portions of the pipe 5 adjacent to the valve 6 after the termination of the regenerating operation. As shown, this brine valve is located at the point of junction of the pipe 5 to the fresh water branch 2, so that when the brine valve is closed and the gate 7 withdrawn, there will be a sudden rush of fresh water at full city pressure against the valve 6 and as the pressure of the brine against the opposite side of the valve is lower than city pressure the valve will move from its seat and the fresh water will force the brine back towards the brine tank. As soon as pressure in the tank is restored to city pressure through lines 3 and 5, the valve 6 will seat and the fresh water which has entered the pipe 5 will be held therein. While a portion of the fresh water required to restore pressure in the brine tank will flow in through branch 3 practice has shown that sufficient fresh water flows past the valve 6 into pipe 5 to displace the brine in the pipe 5 for several inches.

In addition to the displacement effected, as above stated, at the termination of the regenerating operation, it has been found that a further displacement will occur whenever one soft water valve is opened, as the capacity of the tank will change as described on every change of pressure therein.

In case it is found that the change in the capacity of the brine tank on changes of pressure is not sufficient to ensure the flow of a desired quantity of fresh water back into the pipe 5, a chamber D may be so connected to the upper end of the brine tank that an air cushion will be formed. When the tank is under city pressure the air will be compressed and will expand when the drain valve is opened, forcing water from the chamber into the tank; when the drain valve is closed, the air will be again compressed, and by making the chamber of suitable size any desired quantity of fresh water may be forced past the valve 6, when any valve whereby pressure is reduced in the apparatus, is closed.

It is also preferable that the connection of the salt line 5 to branch pipe 2 be at a point above the level of the undissolved salt in the salt tank B, as indicated by the dotted line. If both tanks A and B are left undisturbed for a period of time, say overnight, the specific gravity of the saturated salt solution in the lower part of tank B being greater than that of the water or weaker in salt solution in line 5, there will be a tendency for the liquid in the line 5 to become a saturated solution up to a point approximately level with the undissolved salt in tank B. Therefore, if the connection of line 5 to branch 2 be made above this point, there would be no tendency for the salt solution to displace the water adjacent to the valve 6 or render it saline whereby corrosion of the valve would be produced.

In the construction of apparatus shown herein in Figs. 4 and 5, the chamber $a$ of the valve box C is connected to a water supply by a branch pipe 2, and to the chamber $b$ by a port 22. This chamber $b$ is connected by a pipe 23 to the lower portion of the tank A containing the treating material and by a pipe 24 to the brine tank B which is also connected to the water supply pipe 1 by a branch 3. The chamber $c$ of the valve box is connected by a pipe 25 and a passage 26 in the valve box to the upper portion of the treating tank and by a port 27 to a chamber $d$. A pipe 28 leading to the point of use of softened water extends from the chamber $d$ and the chamber $c$ has an outlet port 29 which in practice will be connected by a pipe 30 to a drain. The flow of brine to the chamber $b$ is controlled by a valve 31 which is, in the construction shown herein, carried by a stem 32 connected to the core of the solenoid 33 and on the stem is carried a valve 34 adapted when raised to reduce below normal the flow of water from the chamber $a$ to the chamber $b$. In the construction shown, the reduced flow is attained by grooving the valve or its seat. The flow of brine from the tank A through the chambers $c$ to the drain is controlled by a valve 35 on the stem 36 attached to the core of the solenoid 37 and on the same stem is secured a valve 38 adapted to close the port 27 during regeneration and flushing.

During the softening operation the water to be treated flows thru the chambers $a$ and $b$, the valve 31 being closed, to the lower end of the tank A up through the treating material through the pipe 25 and passage 26 to chamber $c$ and port 27 to chamber $d$ and thence through pipe 28 to the point of use, the port leading to the drain being closed by the valve 35, the valve 38 being open.

When it is desired to regenerate the treating material, the valves 31 and 35 are opened, the valve 34 raised to reduce flow of fresh water from the chamber $a$ to the chamber $b$ and valve 38 closed, and water will now flow through branch 3 down through the brine tank through pipe 24 to the chamber $b$ through pipe 23 to lower end of the tank A up through the material therein through pipe 25 and passage 26 to chamber $c$ through port 29 to the drain. For flushing out the salt solution, the valve 31 is closed and valve 34 lowered so that there will be a full free flow of fresh water through the chambers $a$ and $b$, pipe 23 to the lower end of the tank A, through pipe 25, passage 26, chamber $c$ and pipe 30 to drain.

In order to replace the brine in the portion of the pipe 5 adjacent to the valve 31, a by-pass, connecting the fresh water to the brine supply pipe 24 at a point adjacent to the valve 31, is employed. In the construction shown in Figs. 4 and 5 the chamber $b$ is connected by a pipe 39 to the pipe 24 at a point immediately below the valve 31, said pipe being provided with a check valve 40 permitting the flow of fresh water to the pipe 24 but preventing any reverse flow. In order to ensure the displacement of the brine, the by-pass is made of capacity equal to that of the branch pipe 2 and the capacity of the branch 3 is reduced as indicated at 41.

It has heretofore been the practice to supply at each regeneration sufficient brine to effect a complete regeneration of all the zeolite or other softening material, and hence the material will be most effective at the beginning of the softening operation, but the efficiency will gradually decrease as softening proceeds. In the practice of the invention described herein it is preferred to so operate that only a partial regeneration is effected at each period. There is a definite relation between the extent of regeneration and the quantity of water softened, and it has been found preferable to effect only such regeneration as will soften the quantity of water used during a definite period say twenty four hours, as the quality of resulting water will be more uniform.

I claim herein as my invention:

1. A water softening apparatus having in combination a tank containing treating material having a connection to a water supply, and outlets for the softened water, brine and flushing water, means for reducing the flow of water from the supply to the treating tank, a brine tank connected to the water supply and to the supply pipe leading to the treating tank, a valve controlling the flow of brine to the treating tank, and a single means for shifting the water reducing means and for opening the brine controlling valve.

2. A water softening apparatus having in combination a tank containing treating material having a connection to a water supply and outlets for softened water, brine and flushing water, a gate for varying the rate of flow of water to the treating tank, a brine tank connected to the water supply and having an outlet connected to the water supply pipe leading to the treating tank, a valve controlling the flow of brine to the treating tank, and a single means for shifting the gate and the brine controlling valve.

3. A water softening apparatus having in combination a tank containing treating material having a connection to a water supply and outlets for softened water, brine and flushing water, a gate for varying the rate of flow of water to the treating tank, a brine tank connected to the water supply and having an outlet connected to the water supply pipe leading to the treating tank, a normally closed valve for controlling the flow of brine to the treating tank and means for simultaneously shifting the gate and opening the brine controlling valve.

4. A water softening apparatus having in combination a tank containing treating material having a connection to a water supply and outlets for softened water, brine and flushing water, a gate for varying the rate of flow of water to the treating tank, valves controlling the flow of softened water, brine and flushing water from the treating tank, a brine tank connected to the water supply and having an outlet connected to the water supply pipe leading to the treating tank, a valve controlling the flow of brine to the treating tank and means for simultaneously shifting the gate, opening the brine controlling valve and the valves controlling the discharge of brine and flushing water from the treating tank and closing the softened water outlet.

5. A water softening apparatus having in combination a tank containing treating material having a connection to a water supply and outlets for softened water, brine and flushing water, a gate for varying the rate of flow of water to the treating tank, a brine tank connected to the water supply and having an outlet connected to the water supply pipe leading to the treating tank, a normally closed valve controlling the flow of brine to the treating tank, means for shifting the gate, the brine controlling valve and valves controlling the outlets from the treating tank, and means operative on the flow of brine from the treating tank for opening the gate and permitting the closure of the brine controlling valve.

6. In a water softening apparatus the combination with a tank containing treating material of a tank containing material for regenerating said treating material, a branched pipe line having its branches connected to said tanks and having a connection with a raw water supply, a pipe connected at one end to the tank containing the regenerating material and at its other end to the branch connected to the treating tank, a check valve for the last named pipe, said check valve being adapted for displacement by pressure in said raw water supply pipe to wash out the regenerating material.

7. In a water softening apparatus the combination with a tank containing treating material, of a tank containing material for regenerating said treating material, a trap connected at one end to said last named tank, a pipe line connected to a raw water supply having a branch connected to said trap and having another branch connected to said treating tank, a pipe connected at one end to the tank containing the regenerating material and at its other end to the branch leading to the treating tank, said trap being adapted to prevent the back flow of regenerating material during the softening period.

8. In a water softening apparatus the combination with a tank containing treating material, of a tank containing material for regenerating said treating material, a system of pipes connecting said tanks and a raw water supply, a drainage chamber for said treating tank, means for regulating the flow from said chamber and a drain pipe connected above said chamber.

9. A water softening apparatus as set forth in claim 5 provided with means for delaying the closing of the drain controlling valve during the flushing operation.

10. A water softening apparatus having in combination a tank containing treating material having a connection to a water supply and outlets for softened water, brine and flushing water, a gate for varying the rate of flow of water to the treating tank, a brine tank connected to the water supply and having an outlet connected to the water supply pipe leading to the treating tank, a normally closed valve for controlling the flow of brine to the treating tank, means for simultaneously shifting the gate and opening the brine controlling valve and means for regulating the flow of brine from the brine tank to the treating tank.

11. A water softening apparatus having in combination a tank containing treating material having a connection to a water supply and outlet for softened water, brine and flushing water, a brine tank connected to the water supply and having an outlet connected to the water supply pipe leading to the treating tank, a valve controlling the flow of brine to the treating tank and means responsive to the variations of pressure in said brine tank to displace the brine from the brine controlling valve.

12. A water softening apparatus having in combination a tank containing treating material having a connection to a water supply and outlet for softened water, brine and flushing water, a brine tank connected to the water supply and having an outlet connected to the water supply pipe leading to the treating tank, a valve controlling the flow of brine to the treating tank and means responsive to the variations of pressure in said brine tank for causing a back flow of water from the source of raw water supply through the brine supply pipe.

13. A water softening apparatus having in combination a tank containing treating material having a connection to a water supply and outlet for softened water, brine and flushing water, a brine tank connected to the water supply and having an outlet connected to the water supply pipe leading to the treating tank, a valve controlling the flow of brine to the treating tank and means controlled by the variations of pressure in said brine tank for automatically displacing the brine from the brine controlling valve.

14. In a water softening apparatus the combination with a tank containing treating material, of a tank containing material for regenerating said treating material, a branched pipe line having its branches connected with said tanks and having a connection with a source of raw water supply and a trap disposed between said raw water connection and the tank containing the regenerating material to prevent the backflow of regenerating material during the softening period, said trap being of greater volume than the volume displaced by the expansion and contraction of the tank containing the regenerating material during the softening and regenerating periods.

15. In a water softening apparatus the combination with a tank containing treating material of a tank containing material for regenerating said treating material, a system of pipes connecting said tanks with a raw water supply and a drainage chamber for said treating tank, means for regulating the flow from the outlet of said chamber and means for taking off water from said chamber in excess of the water flowing through the chamber outlet.

In testimony whereof, I have hereunto set my hand.

ANDREW J. DOTTERWEICH.